United States Patent Office 3,026,352
Patented Mar. 20, 1962

3,026,352
PROCESS FOR THE PRODUCTION OF DIALKALI METAL SALTS OF NITROACETIC ACID
Virgil E. Matthews, Charleston, W. Va., assignor to Union Carbide Corporation, a corporation of New York
No Drawing. Filed Oct. 9, 1959, Ser. No. 845,330
5 Claims. (Cl. 260—526)

This invention relates to an improved process for the production of dialkali metal salts of nitroacetic acid. More particularly, this invention relates to an improved process for the production of dialkali metal salts of nitroacetic acid by the basic intermolecular condensation of nitromethane.

There is a growing trend to supplement animal and human foods with synthetic alpha-amino carboxylic acids. Acids of this type are the building blocks of protein and, as such, are necessary for animal life. Although many alpha-amino acids have been synthesized by complex laboratory methods, no commercially practical method has been developed for the majority of these acids, particularly the so-called essential acids. For example, one method, presently used to synthesize amino acids, proceeds via the alkylation of nitroacetate esters and the subsequent reduction of the nitro group and hydrolysis of the ester group. This process has a serious disadvantage, however, due to the fact that only low yields of the nitroacetate esters are obtained by presently used processes. Several methods have been investigated in an attempt to develop a high-yield synthesis for nitroacetic acid or its salts, or nitroacetate esters but none of these methods have met with marked success. The most promising method appears to be the synthesis of nitroacetate salts via the intermolecular condensation of two molecules of nitromethane in the presence of strong, aqueous alkali, as set forth schematically in the following equations:

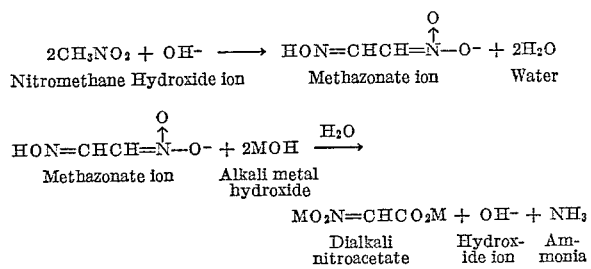

wherein M is an alkali metal. This method still falls short, however, of a commercially feasible process because the salts of nitroacetic acid decompose in strong, aqueous alkaline solution when heated.

The present invention is a novel method for the synthesis of dialkali salts of nitroacetic acid which provides greatly increased yields over the yields obtained by previously known processes and which makes possible a commercially feasible method for the manufacture of amino acids.

Applicants have found that yields of greater than 90 percent of the dialkali metal salt may be obtained by reacting the nitromethane with an alkali metal hydroxide solution, in which the solvent is an alcohol or other non-aqueous, hydroxylic solvent having a boiling point of 100 degrees centigrade, or greater, at atmospheric pressure. While I do not wish to be bound by any theories, it is believed that the higher yields are obtained due to the substantial, but not complete, elimination of water from the system and the stability of the nitroacetate salts in boiling alcohol.

The process essentially comprises reacting nitromethane with an alkali metal hydroxide in a non-aqueous, hydroxylic solvent at a temperature which is greater than the boiling point of water, e.g. greater than 100° C. at atmospheric pressure, but less than about 200° C., for a period of time sufficient to allow complete conversion of the intermediate salts of nitromethane, methazonic acid, and nitroacetonitrile to the nitroacetate salts.

The temperatures at which the condensation is carried out will vary with the pressure on the reaction. In general, the reaction temperature should be greater than the boiling point of water at the reaction pressure but less than 200 degrees centigrade. For example, at atmospheric pressure the reaction should be carried out at temperatures greater than 100 degrees centigrade and preferably greater than 110 degrees centigrade.

The instant process may be carried out at pressures of about atmospheric pressure to about 100 atmospheres, and preferably at pressures from about atmospheric pressure to about 40 atmospheres.

The reaction time at elevated temperatures will vary according to the yield of dialkali nitroacetate desired. Since one mole of ammonia is evolved for each mole of nitroacetate salt produced, a convenient method of following the course of the reaction consists of measuring the amount of ammonia given off in some suitable fashion, such as absorbing the ammonia in hydrochloric acid. In general, reaction times of about 12 to about 20 hours at elevated temperatures were found sufficient, although longer or shorter times may be used if desired. Preferred reaction times, however, are from about 15 hours to about 20 hours.

Any non-aqueous saturated hydroxylic solvent having a boiling point higher than 100 degrees centigrade at atmospheric pressure may be employed as the solvent, although lower aliphatic alcohols containing from 4 to 10 carbon atoms are preferred. Unsaturated compounds should not be employed as solvents, however, because they tend to be unstable at the reaction conditions. Thus, side reactions occur which result in a decreased yield of the nitroacetate salt and complicate the recovery of the salt. Furthermore, it is essential to this invention that the particular alkali metal hydroxide employed is soluble in the material used as the solvent. Solvents which may be employed include isobutanol, 2-butanol, 2-methyl-3-butanol, 2,2-dimethyl-1-propanol, n-hexanol, 2-hexanol, 3-hexanol, 2,2-dimethyl-3-butanol, 2-methyl-1-pentanol, the heptyl alcohols, the octyl alcohols, cyclohexanol, ethylene glycol, propylene glycol, the butylene glycols, the Cellosolves (ethers of ethylene glycol) the Carbitols (ethers of diethylene glycol), and the like. A particularly preferred solvent is n-butanol.

Any alkali metal hydroxide may be used, such as lithium hydroxide, sodium hydroxide, potassium hydroxide, and the like, although potassium hydroxide is preferred because of the ease of purification of dipotassium nitroacetate.

The alcoholic solution, which may be prepared by any method known to those skilled in the art, should be a saturated solution of the alkali metal hydroxide in the solvent. The solvent solution may be recycled to contact additional nitromethane after removal of the product but should be resaturated with hydroxide before recycling. There should preferably be only one such recycle, however, in order to maintain the yields at a high level.

Mole ratios of alkali metal hydroxide to nitromethane may vary between about 2:1 and about 10:1. A ratio of about 4 moles of alkali metal hydroxide to about 1 mole of nitromethane is preferred. The amount of solvent used is determined by the amount of alkali metal hydroxide employed since a saturated solution of alkali metal hydroxide in the solvent is required.

The process of this invention is preferably conducted by adding nitromethane to an agitated solution of alkali metal hydroxide in an alcohol, while maintaining the temperature of the reaction mixture between about 35 and 100 degrees centigrade. The mixture is subsequently heated at reflux temperatures (from 100 to 200 degrees centigrade at atmospheric pressure) until the desired yield is obtained. The reaction should preferably be carried out under a blanket of air but may also be carried out in an inert atmosphere, e.g., a nitrogen atmosphere.

Continuous agitation should preferably be maintained throughout the course of the reaction. For effective slurrying action and maximum contact between the hydroxide and intermediate salts a high speed or a dispersator-type agitator preferably should be used.

After the reaction has proceeded to the desired extent, the reaction mixture is cooled to 25 degrees centigrade or less and the solid is removed from the reaction solvent by filtration or other similar means of liquid-solid separation. The solids are then washed with an alcohol, preferably methanol or ethanol, and dried at temperatures of from about 25 to about 130 degrees centigrade under a vacuum, preferably at pressures of 1 mm. of mercury or less. A preferred drying method comprises an initial drying of 3 to 10 hours at low temperatures followed by a longer period at temperatures of 60 to 110° C. The length of drying time will depend on the extent of solvent removal but will range in general from 6 to 100 hours.

The crude salts may be used as obtained or they may be purified by recrystallization from hot 33 to 50 percent aqueous alkali metal hydroxide solution. The alkali metal hydroxide used for the recrystallization should be the one whose nitroacetate salt was prepared. For example, disodium nitroacetate is recrystallized from aqueous sodium hydroxide, dipotassium nitroacetate from aqueous potassium hydroxide and so on. When recrystallization is employed, the recrystallized salt is obtained in successive crops by concentration of the mother liquor and cooling to 0 to 10° C. and the solid is collected and dried as described above.

The following examples are given to more fully illustrate the process of this invention. These examples are not to be considered as limiting in any manner, since obvious modifications and refinements will occur to those skilled in the art.

EXAMPLE 1

*Preparation of Dipotassium Nitroacetate in n-Butanol*

In a two-liter, three-necked, round-bottomed, creased flask fitted with a high-speed stirrer having a modified disperator head, were placed 705 grams of a 15.9 percent solution of potassium hydroxide in n-butanol. The solution contained 112 grams (2 moles) of potassium hydroxide. Nitromethane (31 grams, 0.5 mole) was added dropwise with vigorous stirring over a 25 minute period. The temperature rose from 30 to 49° C. during the addition. The mixture was then warmed up to reflux temperatures over a 58 minute period and heated at reflux (117 to 120° C.) for 15 hours. The evolved ammonia was absorbed in 0.5 N hydrochloric acid. Analysis of the acid after 15 hours reflux indicated that 0.23 mole of ammonia (92.3 percent of the theoretical) had been evolved.

The reaction mixture was then cooled, and the pale yellow solid product was filtered off, washed with methanol, crushed, and dried in a vacuum desiccator for 8 hours. The material was then powdered and dried in a vacuum oven at 60° C. and 1 mm. of Hg pressure for 7.5 hours. The dried material (66.3 grams) was off-white in color. Ultraviolet analysis showed that the crude solid contained 61.9 percent by weight (41.1 grams, 0.226 moles) of dipotassium nitroacetate and 1.3 percent by weight (0.85 grams, 0.006 mole) of potassium methazonate. This quantity of nitroacetate corresponded to a yield of 90.6 percent, based on nitromethane.

Analysis of the mother liquors indicated that 0.908 mole of potassium hydroxide was used up during the reaction.

EXAMPLE 2

*Preparation of Dipotassium Nitroacetate in n-Butanol Using Intermittent Reflux*

In another reaction, 659 grams of a 17 percent by weight solution of potassium hydroxide in n-butanol (containing 112 grams, 2 moles, of base) were placed in the flask and 31 grams (0.5 mole) of nitromethane were added dropwise and with stirring over a 30 minute period. The mixture was then refluxed for 50 minutes, cooled, and allowed to stand at room temperature overnight. The solution was refluxed for 8.5 hours the next day, then again allowed to stand at room temperature overnight and finally refluxed for an additional 5 hours and 40 minutes on the third day. The total reflux time was 15 hours. The cream-colored product was isolated in the manner described previously and dried in a vacuum dessiccator for 6 hours, followed by 6 hours drying at 60° C. and 1 mm. of Hg pressure in a vacuum oven. The dried product weighed 61 grams. Ultraviolet analysis indicated that it contained 69.9 weight percent (42.6 grams, 0.235 mole) of dipotassium nitroacetate and no methazonate. This corresponds to a yield of 94 percent dipotassium nitroacetate.

EXAMPLE 3

*Preparation of Dipotassium Nitroacetate in n-Hexanol*

A 12.52 percent by weight solution of potassium hydroxide in n-hexanol (895 grams, containing 112 grams, 2 moles, of potassium hydroxide) was placed in a two-liter, 3-necked flask and 31 grams (0.5 mole) of nitromethane were added with stirring over a 17 minute period. The temperature of the reaction mixture rose from 22 to 40 degrees centigrade during the addition. The resulting mixture of cream-colored solid and deep amber-colored liquid was warmed to reflux over one hour, then maintained at reflux temperature (137 to 138° C.) for 20 hours. The heat was then removed and the flask contents were cooled to 20° C. The solid was removed by filtration and washed with acetone and methanol. It was then dried in a vacuum desiccator for 5 hours and in a vacuum oven at 60° C. and 1 mm. of Hg pressure for 20 hours. The dried, sticky solid weighed 100 grams and contained 38 grams (0.21 mole) of dipotassium nitroacetate and no potassium methazonate. The yield of nitroacetate salt was 83.8 percent, based on nitromethane.

EXAMPLE 4

*Isolation of Pure Dipotassium Nitroacetate From the Crude Reaction Product*

Six hundred sixty-six grams of dried crude solid, obtained from the reaction of nitromethane with potassium hydroxide in n-butanol and containing 415 grams of dipotassium nitroacetate by ultraviolet spectral analysis were dissolved in a heated solution prepared from 1600 ml. of water and 800 grams of solid potassium hydroxide. The resulting wine-red mixture was filtered through a sintered-glass funnel and allowed to stand overnight at room temperature. The tan-colored needles which precipitated were collected by filtration, washed with methanol, and dried for 5.5 hours in a vacuum oven at 90° C. and 1 mm. of Hg pressure. Pure potassium nitroacetate (145.5 grams) was recovered. Concentration of the mother liquors and addition of methanol to the concentrate resulted in the isolation of 2 additional crops of solid. These were dried at 90° C. and 1 mm. The combined weight of recovered dipotassium nitroacetate in all 3 crops was 355 grams, equivalent to an 85.5 percent recovery from the crude solid.

Although potassium hydroxide was the only alkali metal hydroxide employed in the above examples, hydroxides of sodium, lithium and the other alkali metals may also be used in this process without impairing its effectiveness.

What is claimed is:

1. In a process for the production of dialkali metal salts of nitroacetic acid, the improvement consisting of reacting nitromethane with a solution of an alkali metal hydroxide in a saturated alcohol having a boiling point of at least 100° C. at atmospheric pressure at a temperature of from about the boiling point of water to about 200 degrees centigrade.

2. The process of claim 1 wherein the alcohol is an aliphatic alcohol having from 4 to 10 carbon atoms.

3. The process of claim 1 wherein the alcohol is n-butanol.

4. The process of claim 1 wherein the alcohol is n-hexanol.

5. In a process for the production of dipotassium nitroacetate, the improvement consisting of adding nitromethane to a solution of potassium hydroxide in n-butanol and refluxing the mixture at a temperature of from about the boiling point of water to about 200° C. for the time sufficient to allow substantial completion of the reaction.

References Cited in the file of this patent

Heilborn: "Dictionary of Organic Compounds," vol. III, pp. 607 (1953).

Migrdichian: "Organic Synthesis," vol. I, pp. 696–698 (1957).